(12) United States Patent
Hsieh et al.

(10) Patent No.: US 7,737,956 B2
(45) Date of Patent: *Jun. 15, 2010

(54) ELECTRONIC DEVICE AND METHOD PROVIDING A CURSOR CONTROL

(75) Inventors: Kuan-Hong Hsieh, Guangdong (CN); Han-Che Wang, Guangdong (CN); Xiao-Guang Li, Guangdong (CN); Wen-Chuan Lian, Guangdong (CN)

(73) Assignees: Hong Fu Jin Precision Industry (Shen Zhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 664 days.

This patent is subject to a terminal disclaimer.

(21) Appl. No.: 11/308,997

(22) Filed: Jun. 6, 2006

(65) Prior Publication Data

US 2007/0075979 A1    Apr. 5, 2007

(30) Foreign Application Priority Data

Sep. 30, 2005   (TW) .............................. 94134336 A

(51) Int. Cl.
*G09G 5/00* (2006.01)
(52) U.S. Cl. ..................................... 345/173
(58) Field of Classification Search ................. 345/156, 345/168, 169, 173; 455/566
See application file for complete search history.

(56) References Cited

U.S. PATENT DOCUMENTS

| | | | |
|---|---|---|---|
| 4,545,023 A * | 10/1985 | Mizzi ........................ 708/143 |
| 4,899,138 A | 2/1990 | Araki et al. |
| 5,515,044 A * | 5/1996 | Glatt ............................ 341/22 |
| 6,020,877 A | 2/2000 | Smith |
| 6,034,668 A | 3/2000 | Jackson |
| 6,229,502 B1 * | 5/2001 | Schwab ....................... 345/1.1 |
| 6,535,144 B1 | 3/2003 | Motoe |
| 6,975,306 B2 * | 12/2005 | Hinckley et al. ............. 345/173 |
| 6,987,467 B2 * | 1/2006 | Romeo et al. .................. 341/22 |
| 6,989,815 B2 * | 1/2006 | Liang et al. .................. 345/156 |
| 2003/0044215 A1 * | 3/2003 | Monney et al. ............. 400/490 |
| 2004/0196267 A1 | 10/2004 | Kawai |

FOREIGN PATENT DOCUMENTS

| | | |
|---|---|---|
| JP | 2000-137571 A | 5/2000 |
| TW | 535096 | 6/2003 |

\* cited by examiner

*Primary Examiner*—Amr Awad
*Assistant Examiner*—Stephen G Sherman
(74) *Attorney, Agent, or Firm*—Winston Hsu

(57) ABSTRACT

An electronic device and method for controlling a cursor is provided. The electronic device includes a display, a timer, and a processing unit. The display includes a screen and a frame thereof. The frame further has a touch sensitive region for generating sensing signals in response to an input operation. Each sensing signal is assigned a coordinate for identification. The timer records a time duration of continuously receiving the sensing signals. The processing unit determines a direction of the input operation according to the coordinates assigned to the sensing signals and a speed of the input operation according to the duration of the timer, and thus moves a cursor displayed on the screen corresponding to the direction and speed. A related method is also provided.

2 Claims, 3 Drawing Sheets

ELECTRONIC DEVICE AND METHOD PROVIDING A CURSOR CONTROL

TECHNICAL FIELD

The present invention relates to user interactive devices and methods, and particularly to a user interactive device and method that is user friendly with respect to screen cursor movements.

GENERAL BACKGROUND

With the advent and introduction of the graphical user interface (GUI), today's computers are driven much more by a cursor control device than ever before. Accordingly, a wide variety of techniques for positioning a cursor on a computer display are available and well known in the computer industry.

A conventional cursor control device is a keyboard. A user can press a variety of keys on the keyboard to control movement of the cursor. However, this cursor movement manner becomes inconvenient when sizes of the keyboards get smaller.

Another conventional cursor control device is a mouse. The user can move the mouse in a direction of the desired cursor movement. Nevertheless, the mouse generally suffers from one or more deficiencies. For example, the mouse requires the user to move his or her hand across large areas to operate efficiently and to permit the movement of the cursor throughout the display area. However, the user's workspace is often limited, as a result, the user must repeatedly lift the mouse. Furthermore, these repetitive operations may also lead to physical fatigue and repetitive stress injuries to the user.

What is needed, therefore, is an electronic device and method for controlling a cursor that can provide a friendly and convenient user interface allowing the user to easily and effectively control movement of the cursor.

SUMMARY

An electronic device enabling a cursor control is provided. The device mainly includes a display, a timer, and a processing unit. The display includes a screen and a frame attached to the screen. The frame further has a touch sensitive region for generating sensing signals in response to an input operation. Each sensing signal has a coordinate for identification. The timer records a time duration of continuously receiving the sensing signals. The processing unit determines a direction of the input operation according to the coordinates assigned to the sensing signals and a speed of the input operation according to the duration of the timer, and thus moves a cursor displayed on the screen corresponding to the direction and speed.

A method for providing a cursor control on an electronic device is also provided. The method includes the steps of: (a) providing a display on the electronic device, the display having a screen and a frame thereof, the frame having a touch sensitive region for generating sensing signals in response to an input operation, each sensing signal having a coordinate for identification; (b) recording a time duration of continuously receiving the sensing signals from the touch sensitive region; (c) determining a direction of the input operation according to the coordinates assigned to the sensing signals and a speed of the input operation according to the duration; and (d) moving a cursor displayed on the screen corresponding to the direction and speed.

Other advantages and novel features will be drawn from the following detailed description with reference to the attached drawing, in which:

DETAILED DESCRIPTION

Figure 1:
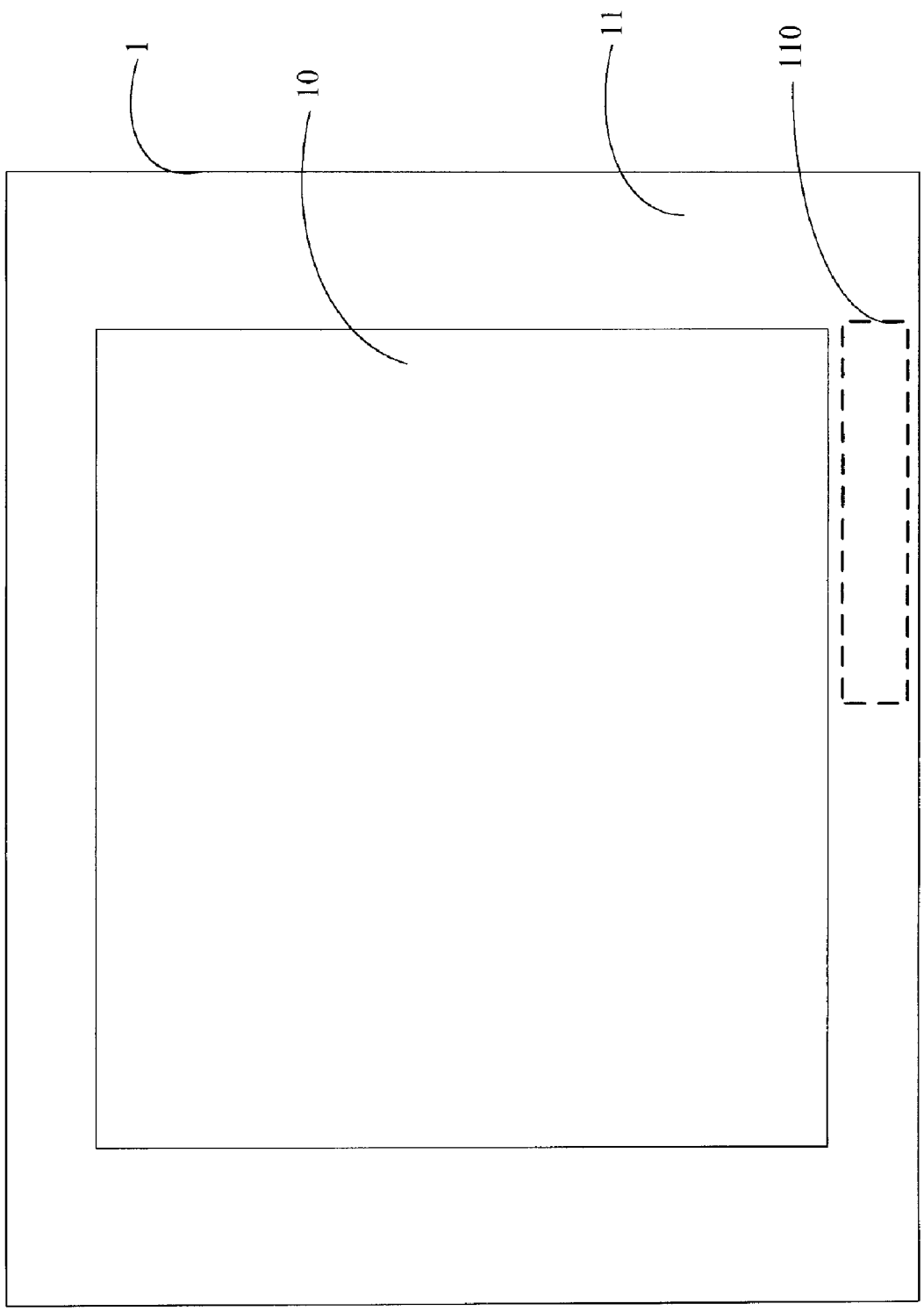
FIG. 1 is a schematic diagram showing an electronic device capable of controlling movement of a cursor displayed on a screen thereof in accordance with a preferred embodiment of the present invention, the electronic device including a frame which has a touch sensitive region thereon.

FIG. 1 is a schematic diagram showing an electronic device capable of controlling movement of a cursor displayed on a screen thereof in accordance with a preferred embodiment of the present invention. The electronic device includes a display 1. The display 1 further includes a screen 10 and a frame 11 thereof. The frame 11 has a touch sensitive region 110 (symbolically indicated as a dashed rectangular outline) for receiving input contact. The touch sensitive region 110 includes a plurality of touch sensitive units beneath. Each touch sensitive unit further has a coordinate for identifying itself and a sensing signal processing circuit 2 (described in more detail below) for generating sensing signals. Therefore, the touch sensitive region 110 is capable of generating sensing signals in response to an input operation.

The electronic device further includes a processing unit 25 and a timer 26 (not shown). The timer 26 records a time duration of continuously receiving the sensing signals from the touch sensitive region 110. The processing unit 25 determines a direction of the input operation according to coordinates assigned to the sensing signals and a speed of the input operation according to the duration of the timer 26, and moves a cursor displayed on the screen 10 corresponding to the direction and speed. For example, the processing unit 25 determines the speed of the input operation is in a low-speed range if the time duration is greater than a first predetermined value (symbolically expressed as 'T1'), and thereupon moves the cursor on the screen 10 word by word. Furthermore, the processing unit 25 determines the speed of the input operation is in a mid-speed range if the time duration is less than or equal to the first predetermined value and greater than or equal to a second predetermined value (symbolically expressed as 'T2'), and thereupon moves the cursor on the screen 10 line by line. In addition, the processing unit 25 determines the speed of the input operation is in a high-speed range if the duration is less than the second predetermined value, and thereupon moves the cursor on the screen 10 page by page.

Therefore, by utilizing the electronic device, controlling the movement of the cursor on the screen can be done easily and effectively, regardless of a size of the electronic device or a workspace for operating the electronic device.

Figure 2:
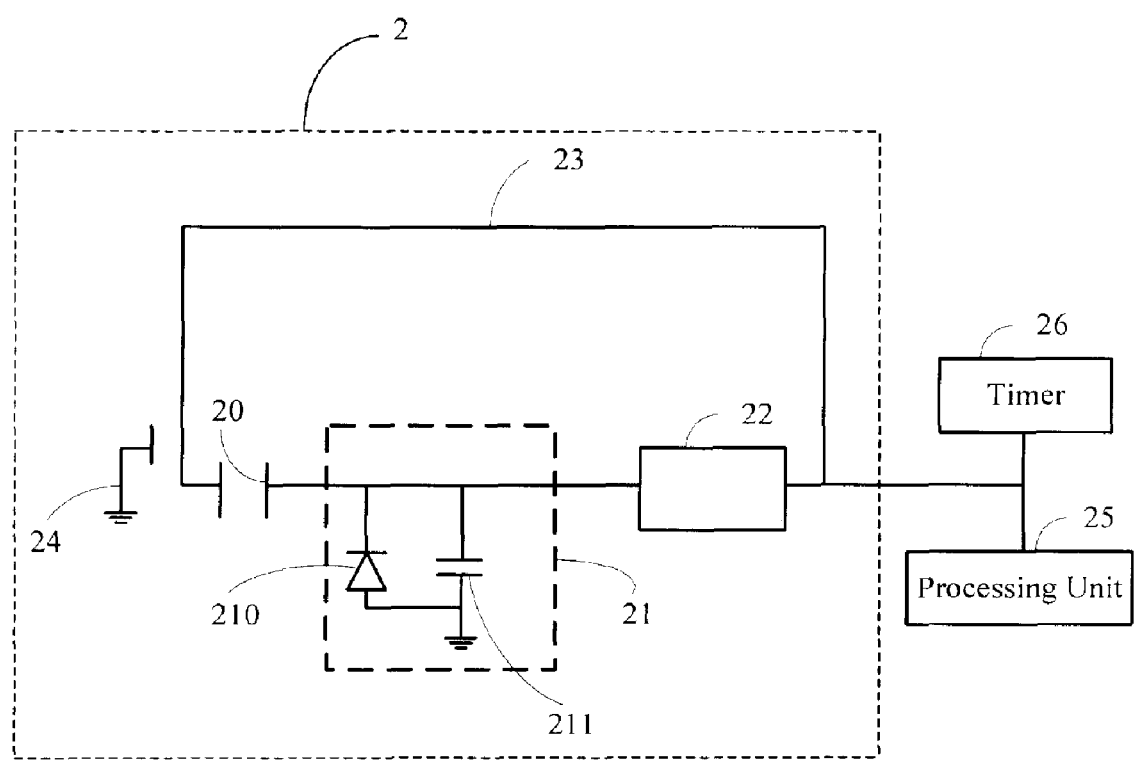
FIG. 2 is an exemplary block diagram representing a hardware infrastructure of a sensing signal processing circuit for a touch sensitive unit beneath the touch sensitive region of FIG. 1 with the sensing signal processing circuit connecting to a processing unit.

FIG. 2 is an exemplary block diagram representing a hardware infrastructure of the sensing signal processing circuit for a touch sensitive unit beneath the touch sensitive region of FIG. 1 with the sensing signal processing circuit connecting to a processing unit. The sensing signal processing circuit 2 mainly includes an antenna 20, a clamping circuit 21, a detector 22, a feedback line 23, and a grounding line 24. The antenna 20 is connected to the clamping circuit 21. The clamping circuit 21 is connected to an input end of the detector 22. An output end of the detector 22 is respectively connected to the processing unit 12 and one end of the feedback line 23. The feedback line 23 forms a positive feedback circuit with the antenna 21. The grounding line 24, namely a space between two adjacent touch sensitive units, is for spacing the touch sensitive units therebetween.

The human body is itself electrically charged with noise and static signals. Therefore, when a user touches the touch sensitive region 110, the noise and static signals of the user flow through the antenna 20. The antenna 20 transmits the noise and static signals to the clamping circuit 21. However, the static electrical signals may cause interference to the noise, and may even fry the detector 22. In addition, a strong noise may adversely influence a resulting sensing signal for the processing unit 25; that is, the sensitivity of the touch sensitive unit may be diminished. Accordingly, the clamping circuit 21 is for eliminating the static signals and for reducing the noise, thus improving the sensitivity accuracy of the touch sensitive unit. The clamping circuit 21 includes a diode 210, and a capacitor 211. The anode of the diode 210 is connected to the antenna 20, while the cathode is connected to ground.

Upon receiving the noise and static signals, the diode 210 filters out the static signals to ground so as to avoid frying the detector 22, and reducing the noise influencing to the capacitor 211. The capacitor 211 further leaks a portion of the reduced noise to ground. Thus the reduced noise is further weakened, thereby obtaining a more accurate sensitivity.

The detector 22 has a high input impedance, so as to easily detect the reduced and weakened noise received from the input end of the detector 22. The detector 22 then converts the further reduced and weakened noise into digital signals, namely the sensing signals, and transmits the digital signals through the output end of the detector 22 to the processing unit 25 to perform corresponding controls. Furthermore, because the feedback line 23 forms a positive feedback circuit with the antenna 20, the noise generated as the user touches the edge of the touch sensitive unit is filtered, thereby further improving the sensitivity accuracy of the touch sensitive unit.

Figure 3:
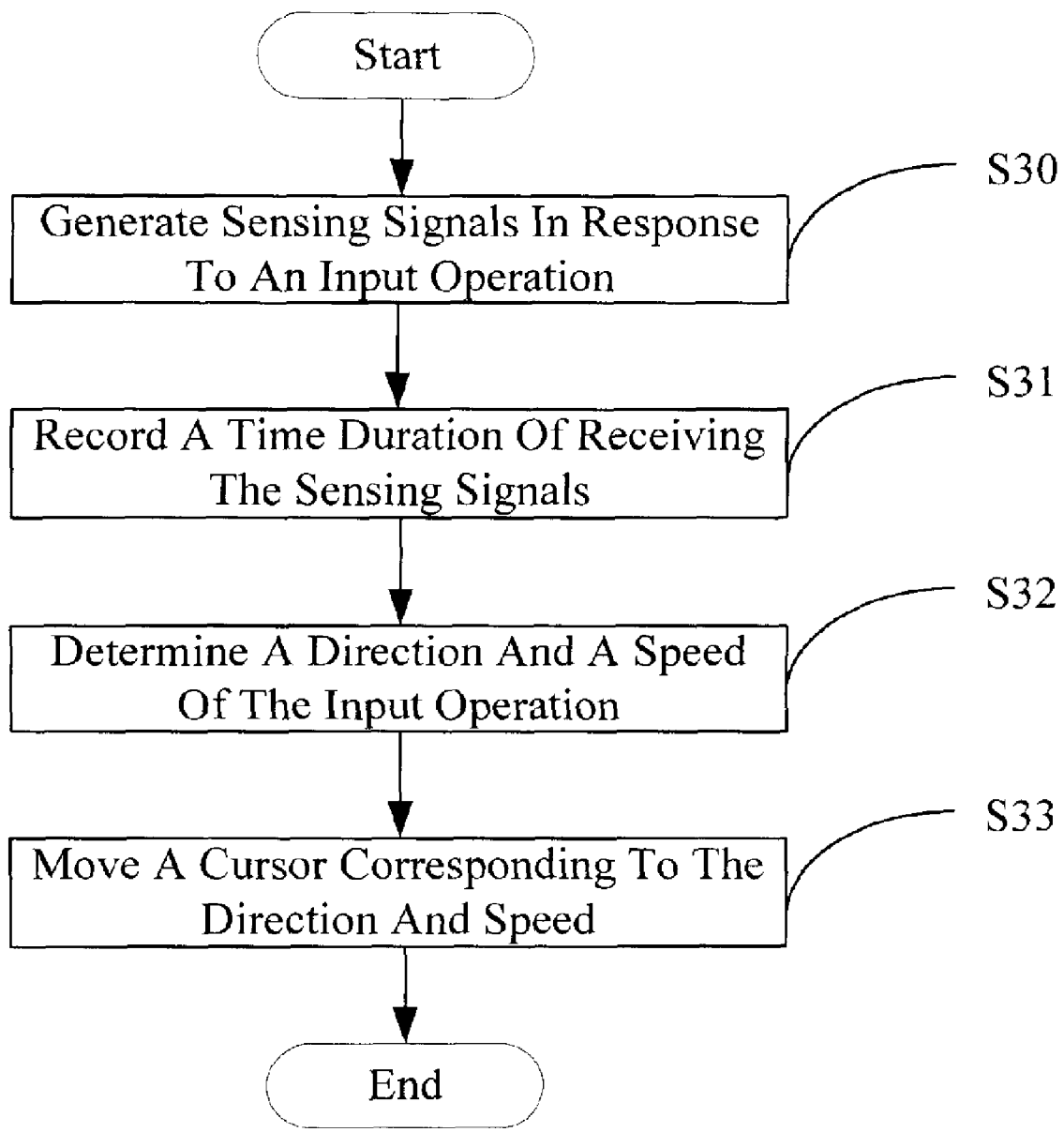
FIG. 3 is a flowchart of a preferred method for a cursor control by utilizing the electronic device of FIG. 1.

FIG. 3 is a flowchart of a preferred method for a cursor control by utilizing the electronic device of FIG. 1. In step S30, the touch sensitive region 110 generates sensing signals in response to the input operation thereon, and transmits the sensing signals to the timer 26 and the processing unit 25 connected thereto. In step S31, the timer 26 records the time duration of continuously receiving the sensing signals from the touch sensitive region 110. In step S32, the processing unit 25 determines the direction of the input operation according to coordinates assigned to the sensing signals and the speed of the input operation according to the duration of the timer 26. For example, if the time duration is greater than the first predetermined value 'T1', the processing unit 25 determines that the speed of the input operation is in the low-speed range; if the time duration is less than or equal to the first predetermined value 'T1' and greater than or equal to the second predetermined value 'T2', the processing unit 25 determines that the speed of the input operation is in the mid-speed range; and if the time duration is less than the second predetermined value 'T2', the processing unit 25 determines that the speed of the input operation is in the high-speed range. In step S33, the processing unit 25 moves the cursor displayed on the screen 10 corresponding to the direction and speed. For example, corresponding to being in the low-speed range, the processing unit 25 moves the cursor on the screen 10 word by word; corresponding to being in the mid-speed range, the processing unit 25 moves the cursor on the screen 10 line by line; and corresponding to being in the high-speed range, the processing unit 25 moves the cursor on the screen 10 page by page.

Although the present invention has been specifically described on the basis of a preferred embodiment and preferred method thereof, the invention is not to be construed as being limited thereto. Various changes or modifications may be made to the embodiment and method without departing from the scope and spirit of the invention.

What is claimed is:

1. An electronic device enabling a cursor control, the device comprising:
   a display having a screen and a frame attached to the screen, the frame comprising a touch sensitive region for generating sensing signals in response to an input operation, each sensing signal being assigned to a corresponding coordinate for identification, wherein the touch sensitive region comprises a plurality of sensing units thereunder, each of which has a sensing signal processing circuit for generating the sensing signals;
   a timer for recording a time duration of receiving the sensing signals; and
   a processing unit for determining a direction of the input operation according to the coordinates assigned to the sensing signals and a speed of the input operation according to the duration of receiving the sensing signals only, and moving the cursor displayed on the screen word by word if the speed of the input operation is in a low-speed range; wherein the processing unit determines the speed of the input operation is in the low-speed range if the time duration of receiving the sensing signals is greater than a first predetermined value.

2. A method for providing a cursor control on the electronic device, the method comprising the steps of:
   providing a display on the electronic device, the display having a screen and a frame attached to the screen, the frame comprising a touch sensitive region for generating sensing signals in response to an input operation, each sensing signal being assigned to a coordinate for identification;
   recording a time duration of receiving the sensing signals from the touch sensitive region;
   determining a direction of the input operation according to the coordinates assigned to the sensing signals and a speed of the input operation according to the duration of receiving the sensing signals only; and
   moving a cursor displayed on the screen word by word if the speed of the input operation is in a low-speed range wherein the speed of the input operation is determined to be the low-speed range if the time duration of receiving the sensing signals is greater than a first predetermined value.

* * * * *